Sept. 29, 1931.   B. T. BROWAND   1,825,046
TOOL HOLDER
Filed March 14, 1928   2 Sheets-Sheet 1
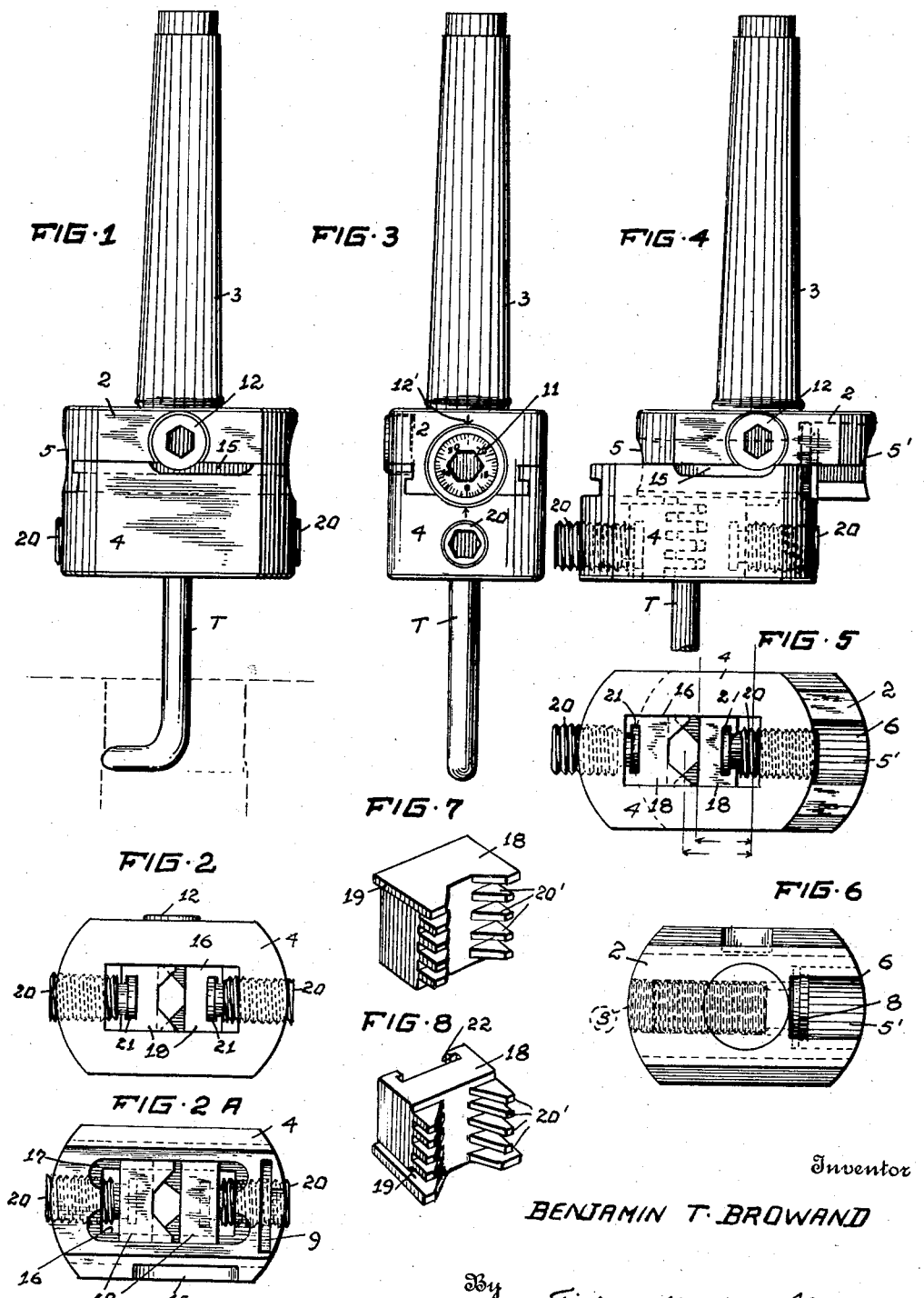
Inventor
BENJAMIN T. BROWAND
By Fisher, Moser & Moore
Attorney Sept. 29, 1931.  B. T. BROWAND  1,825,046
TOOL HOLDER
Filed March 14, 1928  2 Sheets-Sheet 2
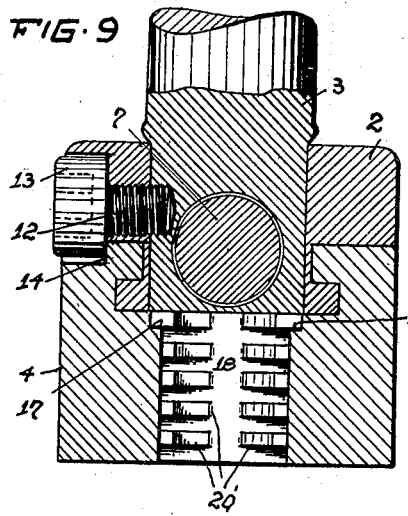
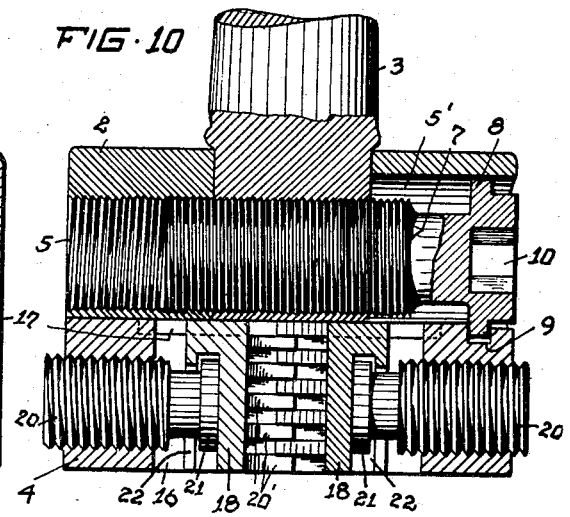
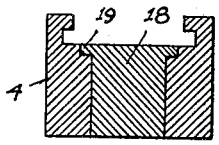
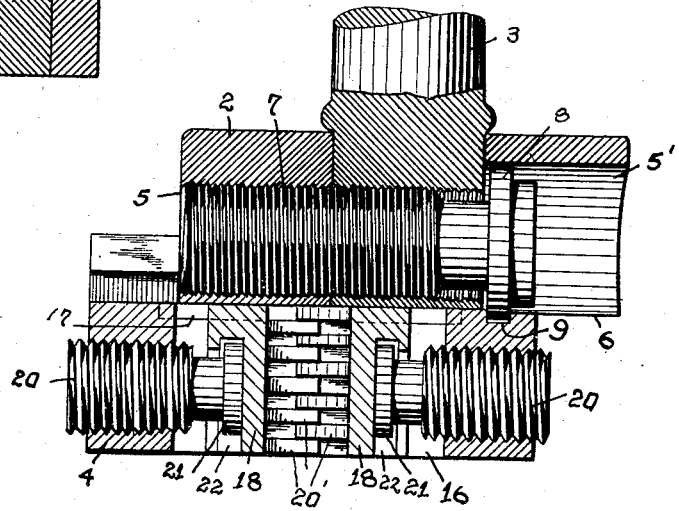
Inventor
BENJAMIN T. BROWAND
By Fisher, Moser & Moore
Attorney Patented Sept. 29, 1931

1,825,046

UNITED STATES PATENT OFFICE

BENJAMIN T. BROWAND, OF CLEVELAND, OHIO

TOOL HOLDER

Application filed March 14, 1928. Serial No. 261,452.

The present invention relates to tool holders, particularly tool holders for metal working machines, such as lathes, drill presses, and boring and finishing machines. In general my object is to provide a tool holder whereby various sized cutting tools may be gripped and held, whereby a pair of gripping members for the tool may be independently adjusted and set at different distances from the axis of the holder, and whereby the said adjustable gripping members and the tool may be jointly adjusted and set in different positions relatively to the axis of the holder, all with a view of facilitating placement of the tool in respect to the work and of giving a wide range of adjustment for varying conditions and kinds of work. Other and more specific objects are also embodied in the details of the construction of the holder, all as will hereinafter more fully appear.

In the accompanying drawings, Fig. 1 is a side view of the tool holder on a reduced scale; Fig. 2 a bottom view thereof; and Fig. 2A a top view of the slidable head alone and apart from the main body of the holder. Fig. 3 is an end view of the holder, and Fig. 4 a side view with the head and cutting tool adjusted and set in a different position than as shown in Fig. 1. Fig. 5 is a bottom view of the holder adjusted as in Fig. 4. Fig. 6 is a bottom view of the base part of the holder as it appears when the slidable head is removed. Fig. 7 is a perspective view of one of the tool gripping elements, and Fig. 8 is a similar view of the same element inverted. Fig. 9 is an enlarged sectional view transversely of the holder, and Fig. 10 a sectional view longitudinally of the holder, without a tool and the upper end of the shank being broken away. Fig. 11 is a sectional view corresponding to Fig. 10 with the slide or head moved to the left. Fig. 12 is a sectional view transversely of a tool gripping member and the slide or head, on a reduced scale.

The holder comprises a body made in two parts, to wit, a base part 2 fixed immovably in any suitable way to a tapering shank 3, and a slide or movable head 4 connected to said base part. The base part and head have corresponding flat sides and rounded ends, and their meeting faces are channeled and ribbed to interlock with each other, having either a rabbeted or dovetailed joint so that the head may move or slide at right angles to the axis of the shank and lengthwise upon the base part. Base part 2 has a screw-threaded bore 5 extending lengthwise thereof at its center, and this bore also extends through the connecting portion of shank 3. Co-extensive with this bore is a smooth counter-bore 5' of larger diameter, and because bore 5 is formed parallel with and relatively near the flat bottom of base part 2 a longitudinal slot 6 is provided in the bottom at one end of base part 2 opposite counter-bore 5'. An adjusting screw 7 extends into screw-threaded bore 5, and this adjusting screw is provided with an annular enlargement, head or flange 8 adapted to fit the counter-bore 5 and to project through slot 6 into a flat-sided circular recess or groove 9 in the top face of movable head 4 near one end thereof, see Fig. 10. The enlarged end of screw 8 is provided with a wrench receiving opening 10, and when the screw is rotated head 4 may be shifted a substantial distance lengthwise of base part 2. The flat end face of screw 7 is also provided with radial graduations or marks 11 which may be brought consecutively into register with an index mark 12' on the outer end of body part 2 and head 4 to indicate the degree of rotation of the screw and the movement imparted to head 4 and the cutting tool T. A locking screw 12 also extends into one side of body part 2, which screw has a flat head 13 adapted to overlap the joint line between base 2 and head 4 and to clamp against a flat shoulder 14 in a notch recess 15 in one side of the head, thereby locking the head rigidly to base part 2 after adjustments have been made. Usually such locking is only required when the holders are used for long periods of time without readjustment.

Head 4 has an elongated or rectangular opening 16 extending lengthwise thereof and open at its top and bottom. The vertical sides of opening 16 are flat and parallel while the upper corner edges thereof are rabbeted to provide recessed seats and guideways 17 for a pair of movable clamping jaws or gripping members 18—18, respectively, for the tool T. Each tool gripping member is provided with flanges 19 adapted to rest slidably within the rabbeted guideways 17, and the clamping portions 20' of the gripping members 18 are angular or of V-shape and of dove-tail interlocking pattern to more securely grip various sizes and shapes of stems and shanks of the cutting tools when the gripping members are forced together by a set of feed screws 20—20, one for each member 18. Thus, the screws 20 extend through screw-threaded openings in the opposite ends of head 4, and the inner ends of the screws have annular enlargements 21 adapted to be confined within and interlock with the flanged grooved portions 22 in the flat end wall of the gripping members 18. These members or clamping jaws 18 may be detached and removed by lifting them upwardly through the open top of head 4 when the head itself is detached from base part 2 but not otherwise.

From the foregoing it will be seen that the clamping jaws or gripping members 18—18 may be shifted lengthwise in the slot or opening 16 in head 4 by backing up one screw and feeding the other screw in the same direction. Accordingly both of the jaws or gripping members 18—18 and tool T also may be shifted transversely in respect to the axis of shank 3 of the holder, and head 4 may also be shifted transversely but in greater degree relatively to the same axis, thereby affording a double adjustment for the cutting tool in respect to the work. The construction of the holder is also such that the tool is rigidly held and supported in a stable position regardless of the range of adjustment or its setting in respect to the shank, although the sectional body of the holder encloses the operating parts very compactly, considering the extensive range of adjustments afforded thereby.

What I claim, is:

1. A tool holder, comprising a supporting member; a cross head secured slidably to the bottom of said member, an adjusting screw for said head extending through said member, said head having a rectangular opening therein, the top of said head being rabbeted at opposite sides of said opening; a pair of flanged clamping elements seated with their flanges within said rabbeted top and extending into said opening; and a pair of adjusting screws within opposite ends of said head extending into said opening for engagement with said clamping elements.

2. A tool holder, including a supporting member, a slidable head, means for sliding said head upon said member, a locking device for said head, and means adjustably mounted upon said head for holding a tool, said tool holding means being held in place by said supporting member.

3. A tool holder, including a supporting part, a head slidably secured to said part, a screw to shift said head, a screw to lock said head upon said part, a pair of tool clamping jaws supported between said supporting part and said head, and screws to shift and lock said jaws.

4. A tool holder, including a supporting part, a slidable head, an adjusting screw for said head, a locking screw for said head, a pair of adjustable tool clamping elements mounted between said head and said supporting part and extending through said head, adjusting screws for said elements, all said screws having wrench sockets of the same size in the ends thereof.

5. A tool holder, comprising a supporting member, a cross head secured slidably to the bottom of said member, a slot recessed at opposite sides extending through said head, a pair of flanged clamping elements seated with their flanged portion within said recessed portion of said slot and extending into said slot and a pair of adjusting screws extending through the side wall of said head into the slotted portion thereof, said clamping elements having grooved portions in their flat end walls engaging annular enlargements of said screw members for rotatable connection therewith.

6. A tool holder, comprising a base section having rabbeted sides and a slotted bottom, an adjusting screw extending through said base section having a flanged head projecting through the bottom slot, a head section having ribbed and channeled sides slidably inter-engaged with the rabbeted sides of said base section and provided with a cross groove interlocked with the flanged head of said adjusting screw, a recessed elongated slot extending vertically through said head section, a pair of flanged clamping jaws slidably confined within the vertical slot of said head section and seated with its flanged portion in the recessed portion of said slot, and adjusting screws extending through opposite sides of said head having annular portions detachably and rotatably coupled with said clamping jaws.

In testimony whereof I affix my signature.

BENJAMIN T. BROWAND.